Aug. 23, 1932.   W. T. BARKER, JR   1,873,866
MEANS FOR AND METHOD OF OBTAINING VARIEGATED GLASS
Filed Aug. 27, 1930
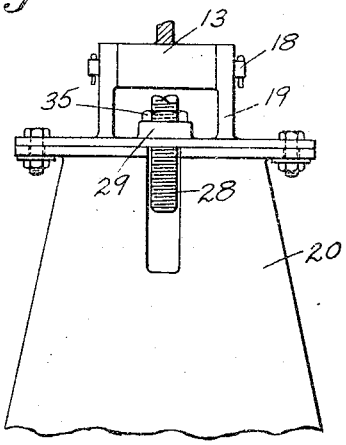
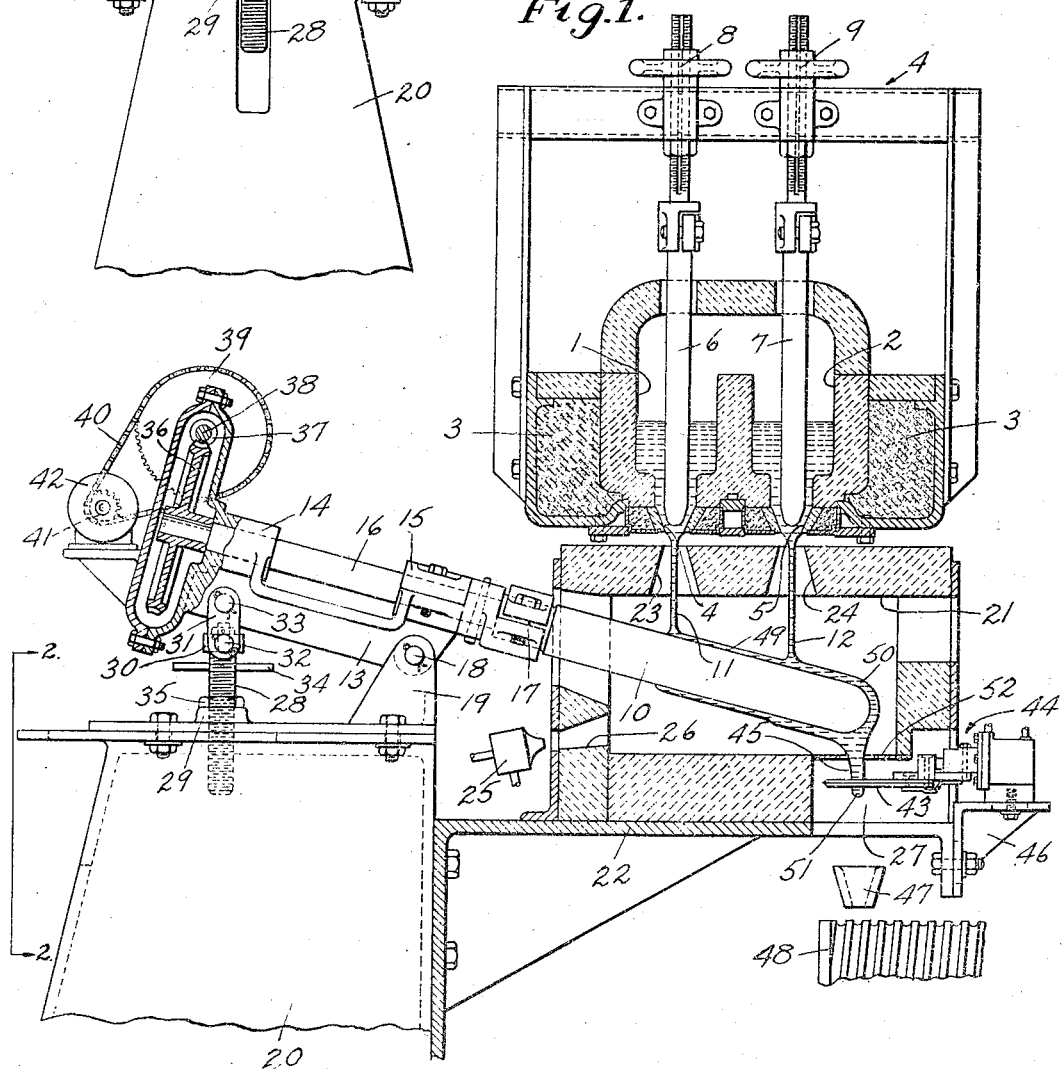
Witness:
G. C. Duling
Inventor;
William T. Barker Jr.
by Brown & Parham
Attorneys.

Patented Aug. 23, 1932

1,873,866

UNITED STATES PATENT OFFICE

WILLIAM T. BARKER, JR., OF WEST HARTFORD, CONNECTICUT, ASSIGNOR TO HARTFORD-EMPIRE COMPANY, OF HARTFORD, CONNECTICUT, A CORPORATION OF DELAWARE

MEANS FOR AND METHOD OF OBTAINING VARIEGATED GLASS

Application filed August 27, 1930. Serial No. 478,069.

An object of the present invention is to improve means for and methods of obtaining variegated glass, particularly variegated glass charges suitable to be formed into striped or variegated glass marbles.

According to the present invention, a rotary inclined glass collecting or gathering implement is provided beneath the flow outlets of adjacent receptacles for molten glass of diverse colors. The implement is rotated so that a stream of glass of a base color from one of said outlets will be wound or accumulated on the rotating implement in a layer which will tend to spread or flow along the periphery of the implement to the lower or delivery end thereof. A stream of glass from the flow outlet of another receptacle falls onto this layer of glass on the rotating implement and is wound thereon as the implement rotates. The number of receptacles containing glass of different colors and the number of streams of glass flowing onto the implement may be selected according to particular requirements. Ordinarily, two such receptacles will suffice.

When sufficient glass has accumulated at the delivery end of the inclined implement, a portion of such glass will begin to sag down in suspension therefrom. Successive charges may be obtained according to the present invention by severing or otherwise separating successive portions of the glass from the glass in suspension at the delivery end of the implement.

Such severance or separation of the charges may be effected while the implement is rotating at a predetermined variable speed. If desired, the rotary movements of the implement may be halted or slowed down periodically or the direction of rotation of the implement may be momentarily reversed to aid in the control of the formation of successive masses in suspension from the delivery end of the implement.

Shears may be dispensed with by stopping the rotation of the implement until a mass of glass sufficient for a charge has sagged down in suspension from the delivery end thereof and has been or is being separated by its own weight from the glass on the implement, the rotary movement of the implement suddenly being resumed to wind up on the implement the depending attenuated thread by which the suspended mass was connected with the glass on the implement or definitely to complete the separation of such mass. However, I prefer to use shears for severing the successive charges from the glass that is in suspension from the delivery end of the implement.

The invention may employ variation of the speed or rotation of the implement to regulably control the distribution of the different colors in the glass charges and also to control the rate of formation and sizes of successive charges. Also, regulable control of the successive charges that are severed from glass in suspension from the delivery end of the implement may be aided or obtained by varying the inclination of the implement.

The rotating implement and the glass thereon and in suspension therefrom preferably are heated or kept sufficiently hot to prevent undue chilling of the glass and the maintenance of such glass in a satisfactory condition as to plasticity and temperature.

In the drawing:

Fig. 1 is a view, partly in elevation and partly in vertical section, showing a structure embodying physical aspects of the invention and adapted for use in the performance of the improved method; and Fig. 2 is a fragmentary view in elevation of a portion of the structure shown in Fig. 1, the view being taken from a vertical plane indicated by the line 2—2 at the left hand side of Fig. 1, looking in the direction of the arrows.

In the drawing, the numerals 1 and 2, respectively, indicate separate receptacles for molten glass of diverse colors. These receptacles may be separate compartments of a forehearth, furnace extension, or other container for molten glass, or may be separate pots located in a suitably heated environment. In the particular construction shown, the receptacles 1 and 2 are separate compartments of a forehearth structure, the walls of which are suitably insulated, as at 3, to prevent undesirable loss of heat from the glass by radiation and through the walls of the glass receptacles. Any suitable supporting structure, such as that indicated generally at 4, may be employed to support the receptacles 1 and 2 in the positions desired and to hold the insulating material and other associate parts in desirable relations with the receptacles 1 and 2.

The receptacles 1 and 2 are provided with discharge outlets respectively indicated at 4 and 5. These discharge outlets may be provided in the bottoms of the receptacles and may include removable and replaceable outlet rings, such as are well known in the art, whereby the size of the streams of molten glass from such outlets may be varied by using outlet rings of different sizes selectively.

The discharge of glass from the receptacles 1 and 2 through the outlets 4 and 5 may be independently controlled and regulated in any suitable known manner, as by the use of the flow regulating implement or valves 6 and 7. These implements 6 and 7 are shown as depending through suitable openings in the cover for the space above the glass in the receptacles 1 and 2, and as being provided with adjusting means indicated at 8 and 9, whereby the implement may be adjusted vertically with respect to the discharge outlets to permit independently regulable streams of glass to flow by gravity from the outlets or to prevent discharge of glass from either or both of the outlets, as desired.

An inclined rotary glass collecting or gathering implement 10 is disposed beneath the outlets 4 and 5. With the arrangement shown, the receptacle 1 is intended to hold glass of a base color and the position of the rotary implement 10 with respect to the outlets 4 and 5 is such that the stream of glass 11 from the outlet 4 strikes the rotary implement 10 at a point farther distant from the lower or delivery end of the implement from that at which a stream of glass 12 from the outlet 5 will descend onto the implement. The glass in the receptacle 2 will have a color different from that of the glass in the receptacle 1 so as to give the desired diversity of color in the charges that are to be obtained.

The rotary implement is shown as having a substantially uniform diameter throughout the portion thereof that is engaged by glass from the outlets 4 and 5, except that the tip or delivery end of such implement is rounded. However, such implement may have an enlarged delivery end portion or head such for example, as that which is shown in the patent to Karl E. Peiler, No. 1,574,736, granted Feb. 23, 1926.

The rotary implement 10 may be supported for rotation and rotated by any suitable means. The particular means shown in the drawing comprises a carrier 13 having spaced bearings 14 and 15, respectively, in which a stem or shaft 16 for the implement is journaled. The stem or shaft 16 is suitably connected with the glass engaging portion of the implement, as by the coupling connection indicated at 17. The glass engaging portion of the implement, being exposed to heat from such glass, preferably is of a refractory material while the shaft and the connecting means 17 may be of metal or of any other suitable material.

The carrier 13 is pivotally supported at 18 on a bracket 19 for angular movement about a horizontal axis. The bracket 19 may be mounted on the top of a table, standard or other part 20 of frame structure adjacent to the receptacles for the glass.

The glass of the streams 11 and 12 and on the implement 10 preferably is subjected to sufficient heat or is protected from the chilling influence of the atmosphere as required to prevent undue chilling of and skin formation on such glass and to maintain desirable plasticity of the glass. To this end the implement 10 may extend into and be mainly or entirely disposed within a heated chamber 21, such chamber being provided by supporting suitable refractory walls on a frame work, such as indicated at 22, beneath the receptacles 1 and 2. The top of the chamber structure will be provided with suitable apertures, such as indicated at 23 and 24, respectively, to permit the streams of glass 11 and 12 to descend from the outlets 4 and 5 onto the rotating implement 10. A burner, indicated at 25, may discharge through a suitable burner opening 26 in a wall of the chamber structure into the chamber and onto the glass on the implement 10 to provide a heated environment for such glass.

The pivoted carrier 13 is shown as being connected with the supporting structure 20 by means which may be adjusted to vary the inclination of the implement 10 and which will maintain such implement in any angularly adjusted position to which it may have been moved. Such connecting and adjusting means comprises a screw 28 that is threaded through an apertured boss 29 on the top of the frame 20. The screw 28 is swivelly connected at its upper end with a cross head 30 which is pivotally connected by the links 31 and the pivot elements or trunnions 32 and 33 with the holder 13. A handle 34 extends through the screw 28 and may be manipulated to turn the screw so as to raise or lower the outer end of the pivoted carrier 13 and thereby to vary the inclination of the implement 10 within the heated chamber 21.

A jam nut 35 may be provided on the screw 28 for engaging with the boss 29 to lock the screw 28 against accidental turning when the inclination of the implement 10 has been adjusted.

The stem 16 of the rotary implement is shown as being provided at its outer end with a worm wheel 36 in mesh with a worm 37 on a driven shaft 38. The shaft 38 is driven by a sprocket 39 which is connected by the chain 40 with a drive sprocket 41 on the drive shaft of a motor 42. It is to be understood that the particular means illustrated in the drawing and just described for rotating the shaft 10 is only one of many well-known driving mechanisms which may be provided. Instead of such driving means, any suitable known variable or adjustable speed driving mechanism may be employed to rotate the implement 10 at a uniform but adjustable speed, at a periodically varied speed or intermittently, and in the same direction, in either of opposite directions selectively, or in opposite directions alternately. For example, the invention may employ the particular driving means that is illustrated and described in the aforesaid Peiler Patent 1,574,736, so that the rotary movements of the implement 10 may be periodically halted for predetermined variable periods of time.

Also, instead of providing the particular adjusting means for connecting the carrier 13 with the stationary frame 20, means such as illustrated and described in Patent 1,349,551, granted to Karl E. Peiler on August 10, 1920, may be provided for varying the inclination of the implement 10 periodically.

A pair of shear blades 43 operable by the pneumatic operating and supporting mechanism, indicated generally at 44, may be provided as shown in Fig. 1 for severing successive charges from the glass 45 in suspension from the delivery end of the implement 10. The shear blades are shown as operating in a space 27 that has been provided by cutting away a portion of the bottom wall of the heated chamber. A heat radiation shield, such as indicated at 52, may be provided between the shear blades and the glass on the delivery end of the implement 10. Such shield of course will have a suitable opening for the glass to descend from the delivery end of the implement past the shearing plane.

The operating and supporting mechanism for the shear blades may be mounted on a bracket 46, attached to the frame structure 22. Any suitable known shear operating mechanism may be employed.

A funnel 47 may be provided to guide to the rolls of a marble forming machine, represented by the roll partially shown at 48, the charges of glass as they are separated by the shears 43 from the glass that is supported by the implement.

The performance of the improved method by steps which may utilize structure as hereinbefore described will be readily understood.

The glass stream 11 from the receptacle 1 descends onto the rotating implement 10 and is wound onto such implement as the latter rotates. The glass on the rotating implement 10 will tend to flow downwardly thereon toward the tip or delivery end of the implement, thus providing a layer of glass 49 thereon. The stream 12 of glass of a different color descends onto the layer of glass 49 and is wound on the latter by the rotation of the implement so that the layer of glass at 50 on the delivery end portion of the implement will be variegated or striped. This thicker layer of glass will comprise glass of the base color and stripes of a glass from the stream 12.

The implement 10 may be rotated at a constant predetermined speed that will permit glass at the tip or delivery end of the implement to sag downwardly and form a pendant mass, such as that which has been designated 45. This pendant mass will include the stripes of color in glass of the base color. Periodic operations of the shears 43 at proper predetermined intervals will result in the severance of a series of charges, each comprising a lower end portion of the suspended mass, such as indicated at 51. As stated, each of these charges, when severed, may fall through the guide funnel 47 to the marble forming machine therebeneath.

The distribution of the different colors in the charges or the striping thereof may be varied by varying the speed of rotation of the implement 10. Also, the charges and the distribution of colors therein or color effects thereof may be varied by varying the inclination of the implement 10. Regulation of the streams 11 and 12 by adjustment of the flow regulating members 6 and 7 likewise may be utilized to regulate the charges and the distribution of colors therein.

As hereinbefore indicated, the shears may be omitted and a separation of the successive charges may be effected by regulation and periodic stoppage of the rotary movements of the implement, supplemented by the action of gravity. Also, the rotary movement of the implement may be stopped or slackened periodically even though shears be employed to sever the charges from the suspended gathers.

The invention is not restricted to the particular steps herein described or to the particular structural details illustrated on the drawing and herein described, but may be varied as required by different conditions of service and for different uses, without departing from the spirit and scope of such invention as set out in the appended claims.

I claim:

1. The method of obtaining variegated glass charges which comprises the steps of flowing glass in a stream onto a rotating implement to provide a layer of glass around said implement, flowing glass of a different color in a stream onto said layer of glass around the implement, and separating charges from successive masses of glass accumulated on the implement from the streams when said masses have attained the desired size.

2. The method of obtaining variegated glass charges comprising the steps of flowing streams of glass of different colors onto an inclined rotating glass gathering implement at different places along the length of said implement, whereby glass of the streams combined will be accumulated in suspension at the lower end of the implement, and periodically severing charges from said suspended glass.

3. The method of obtaining variegated glass which comprises providing a layer of molten glass of a given color on a rotating gathering implement, flowing a stream of glass of a different color onto the glass on the rotating implement, suspending from the implement successive accumulations of glass from said layer and said stream combined, and severing charges from said accumulations.

4. The method of obtaining variegated glass charges which comprises flowing glass of a base color in a stream downwardly onto a rotating inclined implement, whereby a layer of glass will be accumulated around the implement, flowing glass of a different color in a stream downwardly onto said layer of glass on the implement, controlling the rotation of the implement to provide a glass mass in suspension at the lower end of the implement, severing charges periodically from such suspended glass, and subjecting the glass on the implement and in suspension therefrom to a heated atmosphere.

5. The method of obtaining glass charges suitable to be formed into striped glass marbles, comprising the steps of delivering a stream of glass of a base color onto an inclined rotating gathering implement to provide a layer of glass around said implement, striping said layer of glass by delivering thereon a stream of glass of a different color, causing successive masses of striped glass to sag into suspension from said implement, and severing a charge from each of said suspended masses.

6. Apparatus for feeding variegated glass from a plurality of sources of glass of diverse colors, comprising an inclined rotary implement, receptacles for glass of different colors, said receptacles having discharge outlets located above said inclined implement in position to deliver streams of glass of different colors onto the rotary implement at different places along the length of the latter, means for rotating the implement to wind thereon glass from the streams and to provide a depending mass of glass from the streams combined when sufficient glass has been accumulated on the implement, and means for severing charges from such suspended glass.

7. Apparatus for feeding variegated glass from a plurality of sources of glass of diverse colors, comprising an inclined rotary implement, receptacles for glass of different colors, said receptacles having discharge outlets located above said inclined implement in position to deliver streams of glass of different colors onto the rotary implement at different places along the length of the latter, means for rotating the implement to wind thereon glass from the streams and to provide a depending mass of glass from the streams combined when sufficient glass has been accumulated on the implement, and means for heating said implement and the glass thereon and in suspension therefrom.

8. Apparatus for feeding variegated glass from a plurality of sources of glass of diverse colors, comprising an inclined rotary implement, receptacles for glass of different colors, said receptacles having discharge outlets located above said inclined implement in position to deliver streams of glass of different colors onto the rotary implement at different places along the length of the latter, means for rotating the implement to wind thereon glass from the streams and to provide a depending mass of glass from the streams combined when sufficient glass has been accumulated on the implement, and a heated enclosure for said implement and for the glass thereon and in suspension therefrom.

9. Glass feeding apparatus comprising a plurality of separate receptacles for molten glass adjacent to each other and each provided with a bottom discharge outlet, a heated chamber into which streams of glass from said discharge outlets may descend, a rotating inclined implement in said chamber in the path of descent of streams of glass from all of said outlets, whereby glass from the streams combined will be accumulated on the implement and in suspension from the lower end of the implement, means for severing charges periodically from the glass in suspension from the implement, and means for varying the inclination of said implement.

10. Glass feeding apparatus comprising a plurality of separate receptacles for molten glasses of different colors, said receptacles being located adjacent to each other and each having a bottom discharge outlet, a rotary charge collector located below said outlets in position to receive and combine portions of streams of glass discharged from the several outlets to produce variegated glass charges, and means for imparting rotary movement to said collector to control the delivery of said charges to an associate forming machine.

Signed at Hartford, Connecticut, this 22nd day of August, 1930.

WILLIAM T. BARKER, Jr.